US010192109B2

(12) United States Patent
Skogö et al.

(10) Patent No.: US 10,192,109 B2
(45) Date of Patent: Jan. 29, 2019

(54) IDENTIFICATION AND/OR AUTHENTICATION OF A USER USING GAZE INFORMATION (71) Applicant: Tobii AB, Danderyd (SE)

(72) Inventors: Mårten Skogö, Danderyd (SE);
Richard Hainzl, Danderyd (SE);
Henrik Jönsson, Danderyd (SE);
Anders Vennström, Danderyd (SE);
Erland George-Svahn, Danderyd (SE);
John Elvesjö, Danderyd (SE)

(73) Assignee: Tobii AB, Danderyd (SE)

( * ) Notice: Subject to any disclaimer, the term of this patent is extended or adjusted under 35 U.S.C. 154(b) by 42 days.

(21) Appl. No.: 15/131,542

(22) Filed: Apr. 18, 2016

(65) Prior Publication Data
US 2016/0307038 A1    Oct. 20, 2016

Related U.S. Application Data (60) Provisional application No. 62/148,501, filed on Apr. 16, 2015.

(51) Int. Cl.
G06K 9/00       (2006.01)
G06F 21/31      (2013.01)
G06F 21/32      (2013.01)

(52) U.S. Cl.
CPC ....... G06K 9/00604 (2013.01); G06F 21/316 (2013.01); G06F 21/32 (2013.01);
(Continued)

(58) Field of Classification Search
CPC ........... G06K 9/00604; G06K 9/00335; G06K 9/00597; G06K 9/00617; G06K 9/00906; G06F 21/316; G06F 21/32
See application file for complete search history.

(56) References Cited

U.S. PATENT DOCUMENTS 8,235,529 B1 * 8/2012 Raffle .................... A61B 3/113
                                                351/209
8,542,879 B1 * 9/2013 Nechyba ............ G06K 9/00228
                                                382/103
(Continued)

FOREIGN PATENT DOCUMENTS

WO    2016168814        10/2016
WO    2018/125563 A1    7/2018

OTHER PUBLICATIONS

Maeder, et al., "Gaze based user authentication for personal computer applications", Intelligent Mul Timed La, Video and Speech Processing, 2004. Proceedings of 2004 International Symposium on Hong Kong, China, Piscataway, NJ, USA, Oct. 20, 2004, 4 pages.
(Continued)

Primary Examiner — Sean T Motsinger
(74) Attorney, Agent, or Firm — Kilpatrick Townsend & Stockton LLP (57) ABSTRACT According to the invention a system for authenticating a user of a device is disclosed. The system may include a first image sensor, a determination unit, and an authentication unit. The first image sensor may be for capturing at least one image of at least part of a user. The determination unit may be for determining information relating to the user's eye based at least in part on at least one image captured by the first image sensor. The authentication unit may be for authenticating the user using the information relating to the user's eye.

20 Claims, 3 Drawing Sheets (52) U.S. Cl.
CPC ..... *G06K 9/00335* (2013.01); *G06K 9/00597* (2013.01); *G06K 9/00617* (2013.01); *G06K 9/00906* (2013.01)

(56) References Cited

U.S. PATENT DOCUMENTS

| | | | | |
|---|---|---|---|---|
| 8,856,541 | B1* | 10/2014 | Chaudhury | G06F 21/32 382/115 |
| 9,355,612 | B1* | 5/2016 | Shepard | G09G 5/006 |
| 9,649,029 | B2* | 5/2017 | Blixt | A61B 3/113 |
| 2010/0328444 | A1* | 12/2010 | Blixt | A61B 3/113 348/78 |
| 2013/0083007 | A1* | 4/2013 | Geisner | G06T 19/006 345/419 |
| 2013/0336547 | A1* | 12/2013 | Komogortsev | A61B 5/1171 382/117 |
| 2013/0342672 | A1* | 12/2013 | Gray | G06F 3/013 348/78 |
| 2014/0016837 | A1* | 1/2014 | Nechyba | G06K 9/00228 382/118 |
| 2014/0055591 | A1* | 2/2014 | Katz | G06F 3/013 348/78 |
| 2014/0211995 | A1* | 7/2014 | Model | G06F 3/013 382/103 |
| 2014/0320397 | A1* | 10/2014 | Hennessey | A61B 3/113 345/156 |
| 2014/0337930 | A1* | 11/2014 | Hoyos | H04L 63/10 726/4 |
| 2015/0084864 | A1* | 3/2015 | Geiss | G06F 3/013 345/158 |
| 2015/0294464 | A1* | 10/2015 | Kim | G06K 9/00597 382/117 |
| 2016/0035483 | A1* | 2/2016 | Yamada | H01F 27/292 336/192 |
| 2016/0080732 | A1* | 3/2016 | Pedley | H04N 13/0425 345/8 |
| 2016/0307038 | A1* | 10/2016 | Skogo | G06K 9/00604 |
| 2016/0308859 | A1* | 10/2016 | Barry | H04L 63/0861 |
| 2016/0335483 | A1* | 11/2016 | Pfursich | G06K 9/00899 |
| 2017/0046813 | A1* | 2/2017 | Wu | G06K 9/00288 |
| 2017/0061251 | A1* | 3/2017 | Fan | G06K 9/6267 |
| 2017/0091549 | A1* | 3/2017 | Gustafsson | G06K 9/00604 |
| 2017/0109513 | A1* | 4/2017 | Skogo | G06F 21/32 |
| 2017/0180348 | A1* | 6/2017 | Piccolotto | G06K 9/00906 |
| 2017/0185760 | A1* | 6/2017 | Wilder | G06F 21/36 |
| 2017/0193285 | A1* | 7/2017 | Negi | G06K 9/00288 |
| 2017/0235363 | A1* | 8/2017 | Breisinger | G06F 3/0482 |

OTHER PUBLICATIONS

International Search Report and Written Opinion for PCT Application No. PCT/US2016/028090, dated Jul. 13, 2016, 13 pages.

Rigas, et al., "Gaze Estimation as a Framework for Iris Liveness Detection", IEEE International Joint Conference on Biometrics, IEEE, dated Sep. 29, 2014, 8 pages.

International Search Report and Written Opinion for PCT/US2017/066046 dated Jun. 1, 2018, 16 pages.

Related CA application No. 2,983,015 (PCT/2016028090) received an Office Action, dated Aug. 23, 2018, 10 pages.

* cited by examiner

IDENTIFICATION AND/OR AUTHENTICATION OF A USER USING GAZE INFORMATION

CROSS-REFERENCE TO RELATED APPLICATIONS

This application claims priority to Provisional U.S. Patent Application No. 62/148,501 filed Apr. 16, 2015, entitled "IDENTIFICATION OR AUTHENTICATION OF A USER USING GAZE INFORMATION," the entire disclosure of which is hereby incorporated by reference, for all purposes, as if fully set forth herein.

BACKGROUND OF THE INVENTION

The present invention generally relates to systems and methods for user identification and/or authentication of a user using gaze information from the user, and in particular, to systems and methods for allowing a user to login to a device using such gaze information.

Security is of utmost importance in modern computing. With the increased mobility and power of computing devices, more and more devices are used by multiple users. Therefore accurately identifying and enabling multiple users to login to a device is of utmost importance.

Traditional identification and authentication systems rely on simple mechanisms such as password or passphrase authentication. This is troublesome as the system relies on a user's ability to remember the exact syntax of both a username and/or password. And often users must need to remember a multitude of potentially different usernames and password for different systems. Further such information can potentially be learned, extracted, copied or otherwise obtained from a user in order to be used to falsely login as the user.

It has been previously proposed to use other forms of identification and authentication to allow a user to login to a computing device. For example, many computing devices now comprise fingerprint sensors for scanning a user's fingerprint to facilitate logging in of the device. The problem with such systems is that the user must hold their finger still on a sensing surface for some period of time, and therefore impatience as well as additional issues such as dirt and other obstructions on the sensing surface or finger can impede the systems from functioning correctly.

Further, retina scanning technology has been proposed as an alternative authentication technique. In these systems a user's retina is scanned by a camera or the like and matched to a saved retinal profile, thus allowing the correct user to login to the computing device. This system also requires that the user remain still during scanning and thus there exists the potential for the system to fail.

Retina scanning and other facial scanning systems may also be fooled by methods such as scanning a photograph of a person or their eye. Accordingly, there is a need for an improved system to authenticate users as a live persons and allowing for login of a device.

Further there is a need for a contact-less login procedure that is individual to a user and allows the user to authenticate with a computing device, even when being observed by a third party.

BRIEF DESCRIPTION OF THE INVENTION

In one embodiment, a system for authenticating a user of a device is provided. The system may include a first image sensor, a determination unit, and an authentication unit. The first image sensor may be for capturing at least one image of at least part of a user. The determination unit may be for determining information relating to the user's eye based at least in part on at least one image captured by the first image sensor. The authentication unit may be for authenticating the user using the information relating to the user's eye.

In another embodiment, a method for authenticating a user of a device is provided. The method may include capturing at least one image of at least part of a user with a first image sensor. The method may also include determining information relating to the user's eye based at least in part on at least one image captured by the first image sensor. The method may further include authenticating the user using information relating to the user's eye.

In another embodiment, a non-transitory machine readable medium having instructions stored thereon for a method of authenticating a user of a device is provided. The method may include capturing at least one image of at least part of a user with a first image sensor. The method may also include determining information relating to the user's eye based at least in part on at least one image captured by the first image sensor. The method may further include authenticating the user using information relating to the user's eye.

BRIEF DESCRIPTION OF THE DRAWINGS

The present invention is described in conjunction with the appended figures.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth herein.

Specific details are given in the following description to provide a thorough understanding of the embodiments. However, it will be understood by one of ordinary skill in the art that the embodiments may be practiced without these specific details. For example, in any given embodiment discussed herein, any specific detail of that embodiment may or may not be present in all contemplated versions of that embodiment. Likewise, any detail discussed with regard to one embodiment may or may not be present in any potential version of other embodiments discussed herein. Additionally, circuits, systems, networks, processes, well-known circuits, processes, algorithms, structures, and techniques, and other elements in the invention may be discussed without unnecessary detail in order to avoid obscuring the embodiments.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In some embodiments, a system for authenticating a user is provided, whereby the system utilizes information from a gaze determination device. In exemplary embodiments the gaze determination device is an infrared based eye tracking device such as systems available in the market from Tobii (www.tobii.com) or other suppliers. It may also be possible to use an eye tracking device incorporated in a wearable system such as a Virtual Reality or Augmented Reality headset.

In broad terms, embodiments of the present invention relate to systems for authenticating a user according to the following method: (1) validate a user as present in front of a device using information from an image sensor or eye tracking device, (2) validate that the user is an appropriate user of the device based on facial recognition and/or, provide enhanced validation of the user as an appropriate user of the device by receiving and analyzing gaze and/or eye information, and (3) authenticate the user based on information from the preceding steps.

The image captured by the image sensor may comprise solely the user's eye or eyes, or it may further contain extra information such as the user's face. It is a clear objective of the present invention to allow for usage of any information capable of being captured by an eye tracking device. This information includes, but is not limited to, eye openness, eye position, eye orientation and head orientation. An image containing a user's face may be analyzed using facial recognition algorithms as would be readily understood by one of skill in the art, to identify a user.

Further, it may be advantageous to determine that a captured image pertains to a living person. According to some embodiments, one method of doing so may be to analyze the captured image for the presence of infrared light reflected from the cornea of the user. By using an infrared light based eye tracking device, a glint may be present on the cornea of a user's eye(s) which may be captured using an appropriately configured image sensor.

A further method for determining if the captured image pertains to a living person may be checking a series of captured images. This series of captured images may be analyzed to determine whether a user's gaze point is or is not static. A gaze point which is not static will generally indicate a live person. The analysis may even seek and identify known movements of a living eye such as saccades and/or fixations, including micro saccades.

A further method for determining if the captured image pertains to a living person may be comparing images captured while different light sources are activated. For example an image captured while an infrared light source placed coaxially with an image sensor is activated may have a so-called bright pupil effect, while an image captured while an infrared light source placed non-coaxially with an image sensor is activated will have a so-called dark pupil effect. A comparison of the bright pupil and dark pupil image may be performed to determine the presence of a pupil. In this manner it may be difficult to provide a fake pupil to the system.

Once the system has determined that a user is living and identified that user, it may optionally load a personal calibration profile defining the characteristics of at least one of the persons eyes. This calibration profile may be used to alter the determined gaze direction of the user, for example the calibration profile may provide a standard offset to be applied to all determined gaze directions from the user. Alternatively, the calibration profile may contain data on the characteristics of the user's eye(s), for instance the offset of the fovea relative to the optical axis of the eye or the corneal curvature of the eye The user may then gaze at an indicator on a display indicating their desire to login to the system, for example a button stating "Login", a small eye catching icon or the like would be suitable.

In a further improvement, the calibration profile may contain further information such as inter-pupillary distance, pupil size, pupil size variations, bright pupil contrast, dark pupil contrast, corneal radius and the like. This information may be pre-existing in the calibration profile or may be incorporated into the calibration profile at the time of analysis to determine if the user is alive. To perform the login (authentication) procedure the user may do one of the following, depending upon the configuration of the system:

In a first embodiment—Look at a series of images or text displayed in a predetermined order thus essentially gazing in a pattern. The pattern having been defined, assigned to, or chosen by, the user previously, such as during a setup phase of the system. Comparison of the previously defined pattern to the pattern presently detected can be used to determine if the user is authenticated.

In a second embodiment—Follow a moving object with their eye(s), potentially a single moving object amongst a series of moving objects. The particular moving object being previously defined, assigned to, or chosen by, the user during a setup phase of the system, and allowing for login of the device if followed by the users eye(s) instead of other objects also displayed.

In a third embodiment—Gaze at different moving objects in a predefined order among a series of moving objects (the predefined order defined, assigned to, or chosen by, the user during a setup phase of the system).

In a fourth embodiment—Fixate on a predetermined object, image, or part of image (the predefined object, image, or portion of image defined, assigned to, or chosen by, the user during a setup phase of the system).

The specific points in a sequence of gaze movements may be defined in terms of the time a user's gaze rests upon each point. Further, the total amount of time taken to complete a sequence may also be used as a decision point to decide if a sequence is legitimate or not.

It may be desirable to include a "reset" function for starting a login procedure, this may be an icon or the like displayed on the screen at which a user must gaze upon, or otherwise activate, to indicate to the system that the user wished to commence a login procedure.

In a further improvement of the present invention, a "panic" authentication mode may be defined by a user. In this mode, the user may set an authenticate sequence that differs from their regular authentication sequence. When this alternative sequence is entered, a computing device may alter its function such as by limiting functionality and information displayed (bank account information, sensitive information and the like), or the computing device may contact a pre-identified emergency contact such as the police service, or a trusted contact. This contact may be via email, telephone, text message or the like.

An authentication procedure as has been previously described may be used for identification and/or authentication for operation of a computing device, or for a service executed on a computing device. By way of example, the identification and authentication procedures herein described are suitable for authenticating a user with websites, applications and the like.

Having a known calibration profile is useful for a login procedure but not essential. In the case of no calibration profile being loaded, it is possible to compare a gaze pattern between several different static and/or one or more moving objects to match the gaze pattern to a known layout of the imagery. In some embodiments, the gaze pattern can simultaneously be used to create a calibration for the device.

In some embodiments, the system may comprise an eye tracking device with multiple illumination sources. The system may operate the eye tracking device such that images are captured while different illumination sources are activated, which will create variation in shadows in the captured image. This shadow image can be used to model the face of the user for more accurate facial recognition. An additional benefit of this embodiment is that it may be difficult to fake a real person using a flat image such as a printed image, as shadows on such a printed image will not alter based on varying illumination sources.

In some embodiments, three dimensional head pose information may be captured by the image sensor. This head pose information may alter over a series of images and may be used to ensure a live person is captured by the image sensor as well as be used by facial recognition algorithms.

In some embodiments, the eye tracking device in the system may comprise two or more image sensors. By capturing images using two or more image sensors, a distance map may be created as would be understood by a person of skill in the art. This distance map may be used to identify a user and may be individual to said user, thus making it more difficult to fake the presence of the user in the captured images.

Alternatively, by capturing images using two or more image sensors, images from two or several (possibly known) viewpoints can be used without the need to create a distance map by ensuring the person is imaged from multiple angles at a single point in time and matching these images to a prerecorded model representing certain aspects of said persons face and/or at least one eye, thus making it more difficult to fake the presence of the user in the captured images. As a further improvement, once a user has been authenticated and is logged in to a system, the device may periodically perform a procedure to ensure the user of the system is still the same user who was authenticated previously. This procedure may comprise anything herein described in order to compare the user in a captured image, or series of captured images, to the identity of the authenticated user. If the system detects that a user of a device is not the authenticated user, the system may perform one or more of the following actions: notify the user, close an application on the device, remove an item from display on the device, log out of the device, shut down the device, and/or send a notification message to another system or individual.

In some embodiments, any of the systems and methods described herein may be used to log in to a specific application or program rather than to a device. By way of example, in a Massively Multiplayer Online Roleplaying Game (MMORPG), users spend a large amount of time and effort increasing the abilities and characteristics of a computer/virtual character through playing. The present invention may be used to authenticate an owner or authorized operator of a character in the MMORPG. Of course, embodiments of the present invention may suit any form of game or any other software.

Embodiments of the present invention may be suitable for use in any system that requires identification of a user and authentication that said user is an authorized user of the system. Examples of such systems include, but are not limited to, computers, laptops, tablets, mobile phones, traditional land-line phones, vehicles, machinery, secured entryways, virtual reality headsets, and augmented reality headsets.

In some embodiments of the present invention, the authentication procedure may be performed in a virtual reality or augmented reality environment. In this environment it is possible to present to the user objects via a headset or the like, and in two dimensional or simulated three dimensional format. The user may then perform the login procedure by gazing at static or moving objects in the environment, for example in two dimensional or simulated three dimensional space. Or further the user may focus at objects at differing depths in the environment. The user may define the sequence or objects at which the user wishes to gaze as a unique login sequence. Using the sequence at a later time, the device may authenticate the user (in a manner as previously described herein).

In some embodiments, other modalities may be combined with gaze to allow for the creation of a unique login procedure. These modalities may include keyboard, mouse, or touch-based contact such as a touchpad or touchscreen. Further the modalities may include 3D gestures, voice, head pose or specific mechanical input such as buttons. The user may define a procedure that requires gazing at a particular object on a display or within a virtual reality/augmented reality environment while simultaneously enacting a separate modality. By way of example, a user may gaze at an object while speaking a specific passphrase, and/or while performing a particular gesture.

In some embodiments, in order to determine that a user is alive, the systems herein may create an event that triggers dilation of the user's pupil or pupils. For example a display may switch from very dark to very bright or vice versa, a captured image of a user's pupil may then be analyzed to determine if the pupil reacted to the change in light intensity. Further, the sequence, type, or timing of the event could change regularly or between sessions, so as to make it more difficult to account for in the event someone is trying to fool/circumvent the system.

A user's profile, authentication procedure, identity and the like may be stored locally on a computing device and encrypted, or it may be stored remotely and transferred to the local device. The device, such as a gaze tracking device, that captures images of the user must be secure in that no workaround is possible whereby someone can introduce pre-captured images to the system for authentication.

In a further embodiment of the present invention, identification of a user may be combined with other data collected by a computer system. For example, through the use of an eye tracking device or similar, a system according to the present invention may determine the subject of a user's attention and combine this with the identity of the user. By way of description, the system may function in the following manner: (a) a user is identified according to the present invention, (b) the subject of a user's attention is derived and recorded by examining a user's gaze pattern combined with data reflecting information displayed on a screen at the same time the user's gaze pattern was recorded, and (c) the identity of the user is combined with the subject of the user's attention to define attention data.

This attention data may be stored locally on a computer system, or remotely on a remote server. The attention data may be combined with attention data of the same, or different users, to determine representative views of attention towards information.

To further illustrate, this embodiment of the present invention will now be described in the context of a possible use. A computer system equipped with an eye tracking device allows for identification and authentication based on a user's gaze as has been previously described. Once a user has been identified and authenticated, the eye tracking device determines a user's gaze direction in relation to information displayed on the screen. For example the information may be an advertisement. Elements of the user's gaze relative to this advertisement is recorded by the system, the elements including date and time of gaze, duration of dwell, saccade direction, frequency and the like. These elements are combined with the identity of the user and stored by the system. The storage being either locally on the computer system, or transmitted via the internet or the like to a remote server. This may be repeated many times over for the same advertisement in the same location, in different locations, or different advertisements. The information may be in any form capable of being displayed by a computer system, not just an advertisement, it may include images, text, video, web pages and the like.

Once data has been collected for at least two items of information, or from at least two users. The information may be collated to present representative views. For example, by knowing the identity of a user an associated information such as age, gender, location and the like, the present invention may generate reports such as "Dwell time for males aged 15-19" for various pieces of information. A person of skill in the art will readily recognize that by combining the identity of a user, with the subject of that user's attention, many combinations of information may be collected, stored, analyzed and reported upon.

In a further improvement of the present invention, a system according to the present invention may utilized an eye or gaze tracking device to identify and/or authenticate a user, so as to allow the user to operate a computing device. Once authenticated, the system may continuously monitor information captured by the gaze tracking device and check said information for the presence of a person other than the authenticated user in front of the computing device. If another person is located in front of the computing device, the system may cause some information to be obscured or not displayed by the computing device. The identity of the at least one other person need not be known, the mere fact that another person is present may be sufficient. In this manner, when more than just the authenticated user is viewing a computing device, sensitive information such as bank account information and the like may be hidden and protected. The authenticated user may choose to override this functionality through a software override, or identify and authenticate the additional person(s) using the present invention or any other known identification and authentication procedure.

The present invention may further identify and collect behavioral biometrics including, but not limited to, head movement, blink frequency, eye movement such as saccades, eye openness, pupil diameter, eye orientation and head orientation. This information may be collected during the identification and authentication of a user, an also continuously during a user's use of a computing device. Some or all of this information may be saved in the form of a profile for later identification and authentication of the user.

Further, according to the present invention, once a user has been identified and authenticated with a computing device, and that user moves away from the computing device, there may be a need to re-authenticate the user upon returning to the computing device. To implement this, a time period may be defined during which, if an authenticated user returns no re-authentication is needed, but if the time period is exceeded, a re-authentication is needed. Further, the system may identify a returning user using any previously described behavioral biometrics and if the system identifies the new user as a different identity than the authenticated user, or an unrecognized identity, a re-authorization procedure must follow.

On a related note, once a user has been identified and authenticated according to the present invention and that user ceases to use a computing device for a predetermined period, the computing device may enter a "locked" mode. To unlock the computing device, a simplified procedure such as following a moving object may be used.

In a further improvement of the present invention, the system may use information gathered by a gaze tracking device to determine the state of a user. For example, the system may determine the level of brightness in the user's environment, the level of brightness emitted from the display of a computing device and calculate an expected pupil size of a user. The system may also, or instead, use historical information regarding the pupil size of the particular user. The system may then determine the mental state of a user based on their pupil size. For example an enlarged pupil may indicate a surprised or excited state, or even the presence of mind altering substances.

Any reference in the present invention to gaze or eye information may be substituted in some circumstances with information relating to user's head. For example, although the resolution is likely not as high, it may be possible to identify and authenticate a user using only their head orientation information. This could further extend to expressions, blinking, winking and the like on a user's face.

Although the present invention is described with reference to a computing device having an eye tracking device comprising an image sensor, it should be understood that such systems exist in many forms. For example an eye tracking device may contain all necessary computational power so as to control a display or computing devices directly. For example an eye tracking device may contain an application-specific integrated circuit (ASIC) which may perform all or part of the necessary algorithmic determinations as required by the present invention.

Figure 1:
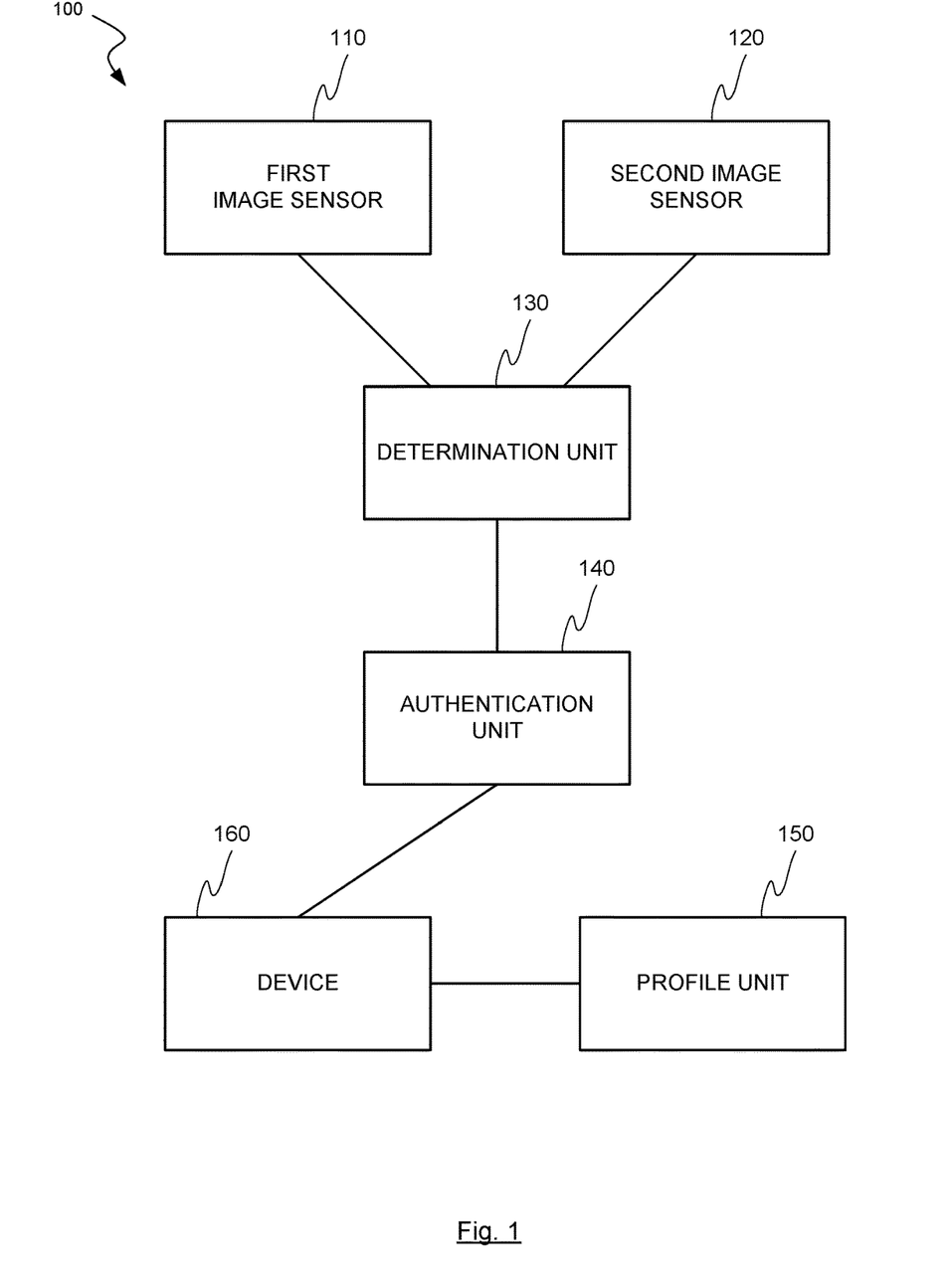
FIG. 1 is a block diagram of one system of one embodiment of the invention for authenticating a user of a device.

FIG. 1 is a block diagram of one system 100 of one embodiment of the invention for authenticating a user of a device. As described above, the system may include a first image sensor 110, a second image sensor 120, a determination unit 130, an authentication unit 140, a profile unit 150, and a device 160 (for which the user is being authenticated). While communication channels between components have been shown as lines between various components, those of skill in the art will understand that other communication channels between components may be present and not shown in this particular example.

Figure 2:
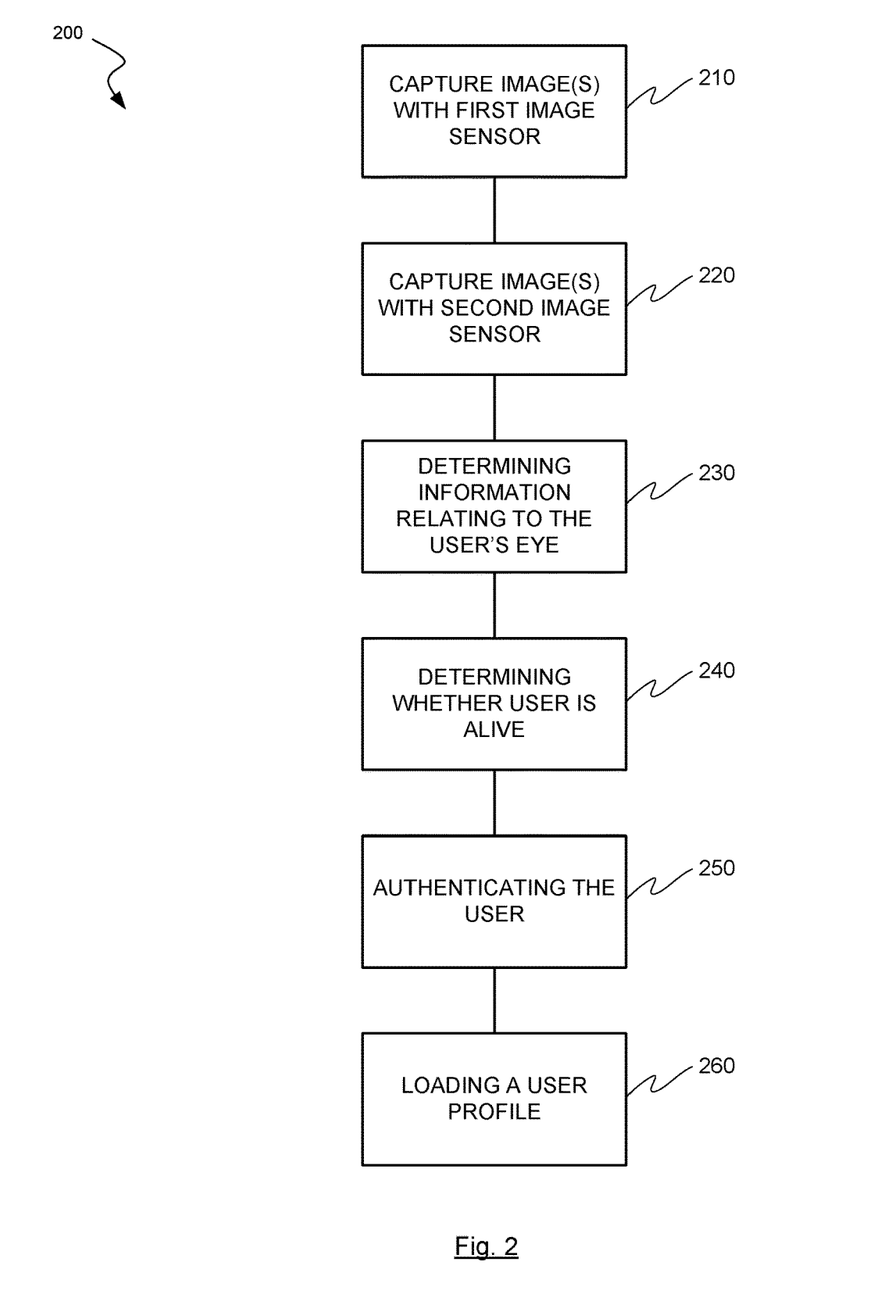
FIG. 2 is a block diagram of one method of one embodiment of the invention for authenticating a user of a device.

FIG. 2 is a block diagram of one method 200 of one embodiment of the invention for authenticating a user of a device. As described above, the method may include, at step 210, capturing image(s) with a first image sensor. At step 220, image(s) may be captured with a second image sensor. At step 230, information may be determined relating to the user's eye from the image(s). At step 240, it may be determined whether the user is alive based on the preceding acquired information and determinations. At step 250, also based on the preceding acquired information and determinations, it may be determined whether to authenticate the user. At step 260, a user profile may be loaded based upon authentication of the user.

Figure 3:
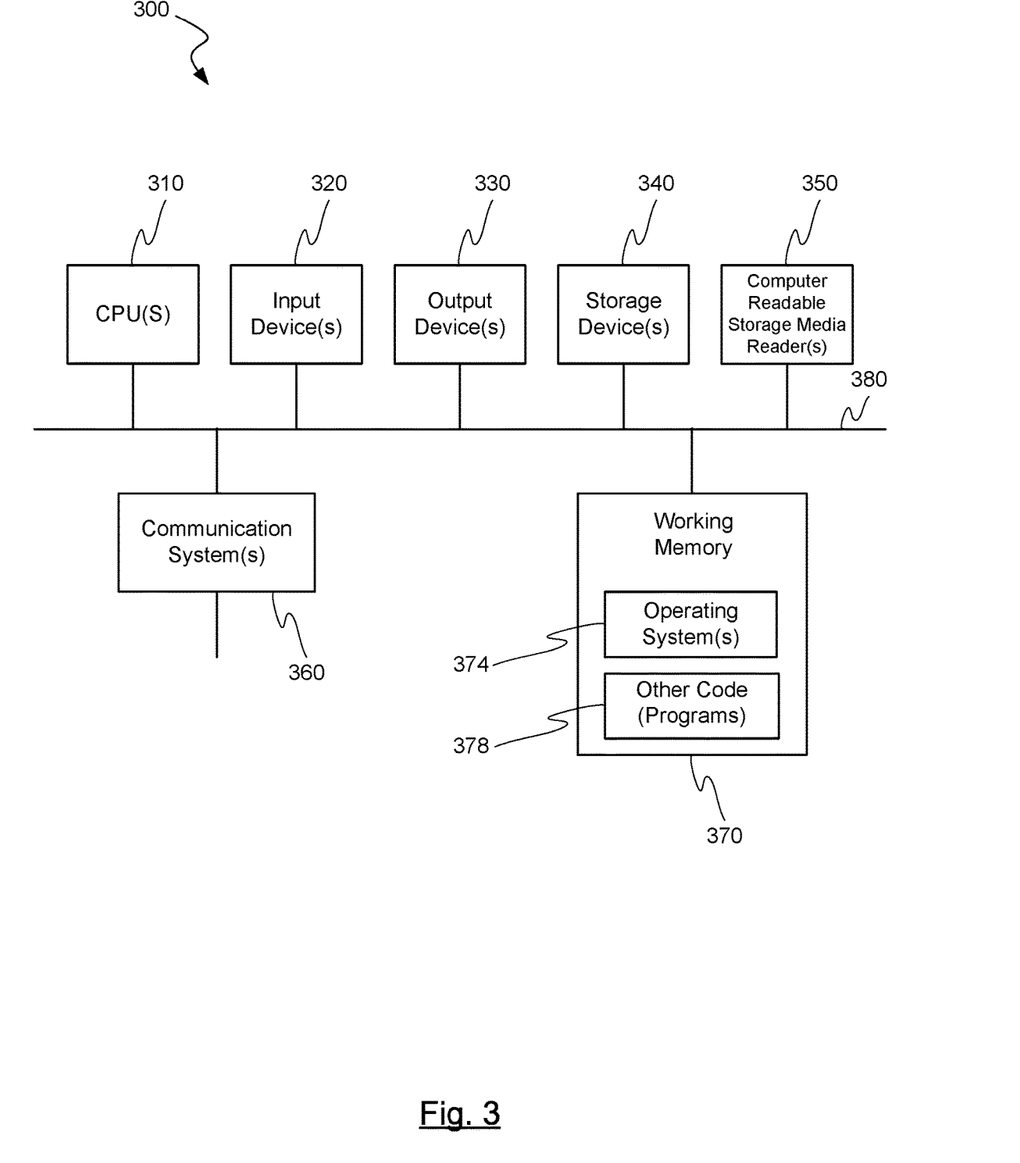
FIG. 3 is a block diagram of an exemplary computer system capable of being used in at least some portion of the apparatuses or systems of the present invention, or implementing at least some portion of the methods of the present invention.

FIG. 3 is a block diagram illustrating an exemplary computer system 300 in which embodiments of the present invention may be implemented. This example illustrates a computer system 300 such as may be used, in whole, in part, or with various modifications, to provide the functions of any of the systems or apparatuses discussed herein. For example, various functions of the eye tracking device may be controlled by the computer system 300, including, merely by way of example, gaze tracking and identification of facial features, etc.

The computer system 300 is shown comprising hardware elements that may be electrically coupled via a bus 390. The hardware elements may include one or more central processing units 310, one or more input devices 320 (e.g., a mouse, a keyboard, etc.), and one or more output devices 330 (e.g., a display device, a printer, etc.). The computer system 300 may also include one or more storage device 340. By way of example, storage device(s) 340 may be disk drives, optical storage devices, solid-state storage device such as a random access memory ("RAM") and/or a read-only memory ("ROM"), which can be programmable, flash-updateable and/or the like.

The computer system 300 may additionally include a computer-readable storage media reader 350, a communications system 360 (e.g., a modem, a network card (wireless or wired), an infra-red communication device, Bluetooth™ device, cellular communication device, etc.), and working memory 380, which may include RAM and ROM devices as described above. In some embodiments, the computer system 300 may also include a processing acceleration unit 370, which can include a digital signal processor, a special-purpose processor and/or the like.

The computer-readable storage media reader 350 can further be connected to a computer-readable storage medium, together (and, optionally, in combination with storage device(s) 340) comprehensively representing remote, local, fixed, and/or removable storage devices plus storage media for temporarily and/or more permanently containing computer-readable information. The communications system 360 may permit data to be exchanged with a network, system, computer and/or other component described above.

The computer system 300 may also comprise software elements, shown as being currently located within a working memory 380, including an operating system 384 and/or other code 388. It should be appreciated that alternate embodiments of a computer system 300 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 300 may include code 388 for implementing any or all of the function of the various elements of the architecture as described herein. For example, software, stored on and/or executed by a computer system such as system 300, can provide the functions of the eye tracking device, and/or other components of the invention such as those discussed above. Methods implementable by software on some of these components have been discussed above in more detail.

The invention has now been described in detail for the purposes of clarity and understanding. However, it will be appreciated that certain changes and modifications may be practiced within the scope of the appended claims.

What is claimed is:

1. An eye tracking system for authenticating a user of a device, the system comprising:
    a first image sensor for capturing at least one image of at least one part of a user;
    a determination unit for determining information relating to an eye of the user based at least in part on at least one image captured by the first image sensor;
    an authentication unit for authenticating the user using the information relating to the eye of the user; and
    a profile unit for:
        loading an eye tracking calibration profile based on the user being authenticated by the authentication unit, the eye tracking calibration profile storing an offset, the offset being between a fovea of the eye of the user relative to an optical axis or between the fovea and a corneal curvature of the eye of the user;
        performing a login procedure using the eye tracking calibration profile and gaze information determined by the determination unit as part of the login procedure, wherein the login procedure comprises:
            presenting one or more virtual objects;
            receiving, from the determination unit, the gaze information that defines characteristics of the eye when viewing the one or more virtual objects; and
            confirming the characteristics of the eye with eye information from the eye tracking calibration profile; and
        altering future gaze information of the eye of the user based at least in part on the eye tracking calibration profile, the future gaze information determined by the determination unit as part of tracking the eye of the user after completion of the login procedure.

2. The system according to claim 1, wherein the determination unit is further for determining whether the user is alive based at least in part on at least one image captured by the first image sensor.

3. The system according to claim 2, wherein the determination unit uses a glint from a cornea of the eye of the user in an image captured by the first image sensor.

4. The system according to claim 2, wherein the determination unit uses a series of images captured by the first image sensor to determine that a gaze direction of the user is static.

5. The system according to claim 2, wherein the determination unit determines a presence of a pupil in a first image captured by the first image sensor to a second image captured by the first image sensor, wherein the first image was captured while a first illuminator co-axial with the first image sensor was active, and the second image was captured while a second illuminator not co-axial with the first image sensor was active; and compares the first image captured by the first image sensor to the second image captured by the first image sensor.

6. The system according to claim 2, wherein the determination unit determines head pose information for the user.

7. The system according to claim 2, further comprising a second image sensor for capturing at least one image of at least part of the user.

8. The system according to claim 7, wherein the determination unit compares a first image captured by the first image sensor with a second image captured by the second image sensor.

9. The system according to claim 1, wherein the eye tracking calibration profile further stores an offset between a gaze direction determined by an eye tracker and an actual gaze direction of the user.

10. The system according to claim 1, wherein the eye tracking profile is part of a user profile that, when activated, influences the behavior of a computer application running on a computer.

11. A method for authenticating a user of a device, the method comprising:
capturing at least one image of at least part of the user with a first image sensor;
determining information relating to an eye of the user based at least in part on at least one image captured by the first image sensor;
authenticating the user using the information relating to the eye of the user;
loading an eye tracking calibration profile based on authenticating the user, the eye tracking calibration profile storing an offset, the offset being between a fovea of the eye of the user relative to an optical axis or between the fovea and a corneal curvature of the eye of the user;
performing a login procedure using the eye tracking calibration profile and gaze information determined as part of the login procedure, wherein the login procedure comprises:
presenting one or more virtual objects;
receiving the gaze information that defines characteristics of the eye when viewing the one or more virtual objects; and
confirming the characteristics of the eye with eye information from the eye tracking calibration profile; and
altering future gaze information of the eye of the user based at least in part on the eye tracking calibration profile, the future gaze information determined as part of tracking the eye of the user after completion of the login procedure.

12. The method according to claim 11, wherein the method further comprises determining whether the user is alive based at least in part on at least one image captured by the first image sensor.

13. The method according to claim 12, wherein determining the information relating to the eye of the user comprises:
determining a presence of a pupil in a first image captured by the first image sensor to a second image captured by the first image sensor, wherein the first image was captured while a first illuminator co-axial with the first image sensor was active, and the second image was captured while a second illuminator not co-axial with the first image sensor was active; and
comparing the first image captured by the first image sensor to the second image captured by the first image sensor.

14. The method according to claim 12, wherein the method further comprises capturing at least one image of at least part of the user with a second image sensor.

15. A non-transitory machine readable medium having instructions stored thereon for authenticating a user of a device, wherein the instructions are executable by one or more processors for at least:
capturing at least one image of at least part of the user with a first image sensor;
determining information relating to an eye of the user based at least in part on at least one image captured by the first image sensor;
authenticating the user using the information relating to the eye of the user;
loading an eye tracking calibration profile based on authenticating the user, the eye tracking calibration profile storing an offset, the offset being between a fovea of the eye of the user relative to an optical axis or between the fovea and a corneal curvature of the eye of the user;
performing a login procedure using the eye tracking calibration profile and gaze information determined as part of the login procedure, wherein the login procedure comprises:
presenting one or more virtual objects;
receiving the gaze information that defines characteristics of the eye when viewing the one or more virtual objects; and
confirming the characteristics of the eye with eye information from the eye tracking calibration profile; and
altering future gaze information of the eye of the user based at least in part on the eye tracking calibration profile, the future gaze information determined as part of tracking the eye of the user after completion of the login procedure.

16. The method according to claim 11, further comprising, after loading the eye tracking calibration profile:
capturing other images of at least part of the user;
detecting a presence of a different user within a range of the first image sensor based at least in part on the other images;
receiving information indicating that an authentication of the different user be performed;
authenticating the different user based at least in part on receiving the information; and
adjusting content displayed on a display based at least in part on detecting the presence of the different user and authenticating the different user.

17. The system of claim 1, wherein the gaze information comprises at least one of: (i) first gaze information being collected as the user gazes at a series of graphical elements being presented on a display in a first predefined order; (ii) second gaze information being collected as the user gazes at a moving graphical object being presented on the display; (iii) third gaze information being collected as the user gazes at a plurality of moving graphical objects being presented on the display in a second predefined order; or (iv) fourth gaze information being collected as the user fixates his gaze at a predetermined graphical object being presented on the display.

18. The system of claim 1, wherein the gaze information comprises a sequence of gaze movements being defined on basis of a period of time the user's gaze rests upon each point.

19. The system of claim 1, wherein the login procedure was defined, assigned to, or chosen by the user previously.

20. The system of claim 1, wherein the login procedure is unique to the user and comprises a combination of the user gazing at least one virtual object and enacting a separate modality.

* * * * *